D. O. HOLEMAN.
AUTOMOBILE HAY RAKE.
APPLICATION FILED JULY 31, 1914.
1,251,373.
Patented Dec. 25, 1917.
2 SHEETS—SHEET 2.
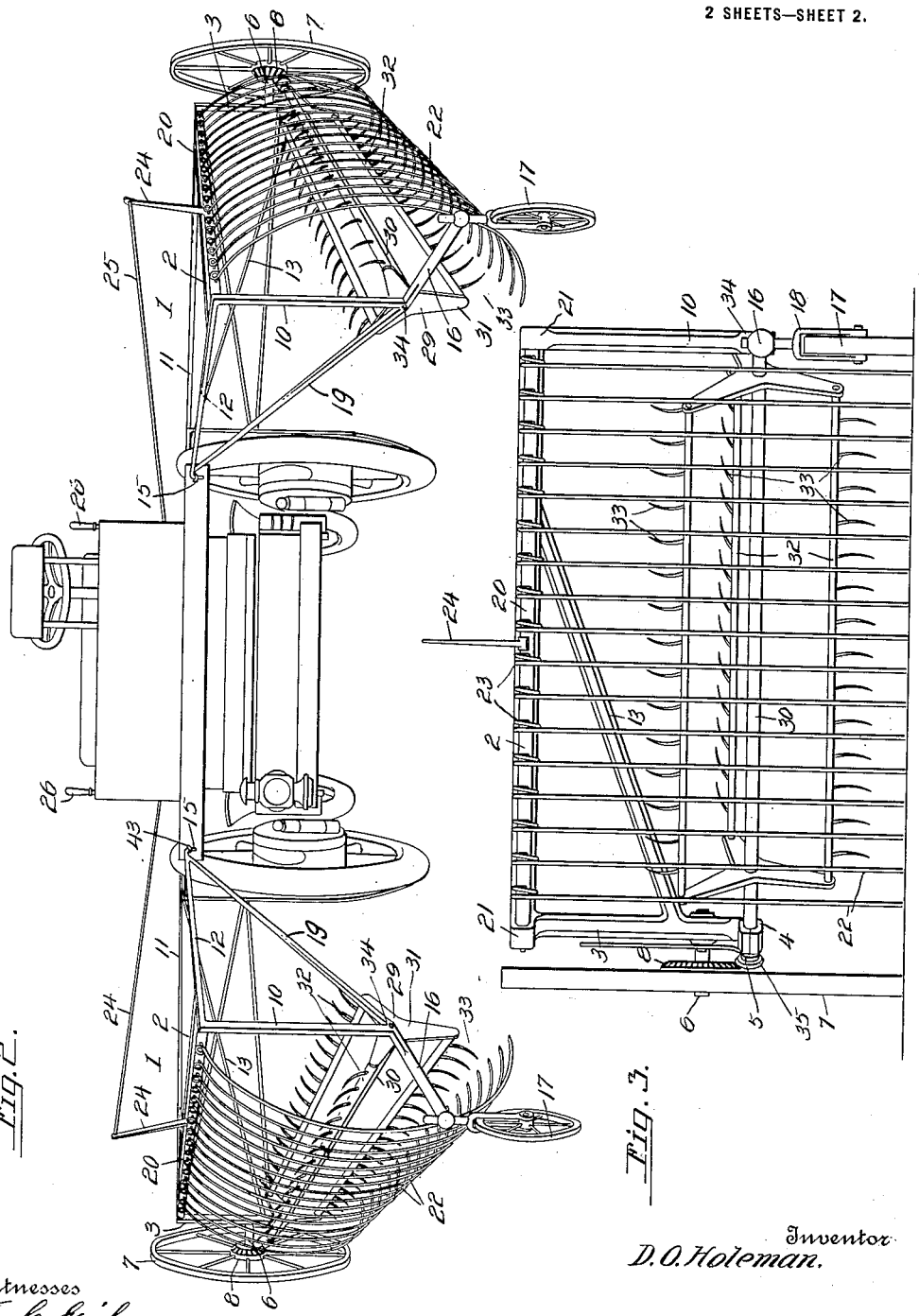
Witnesses
F. C. Gibson.
J. W. Garner
Inventor
D. O. Holeman.
By Victor J. Evans
Attorney

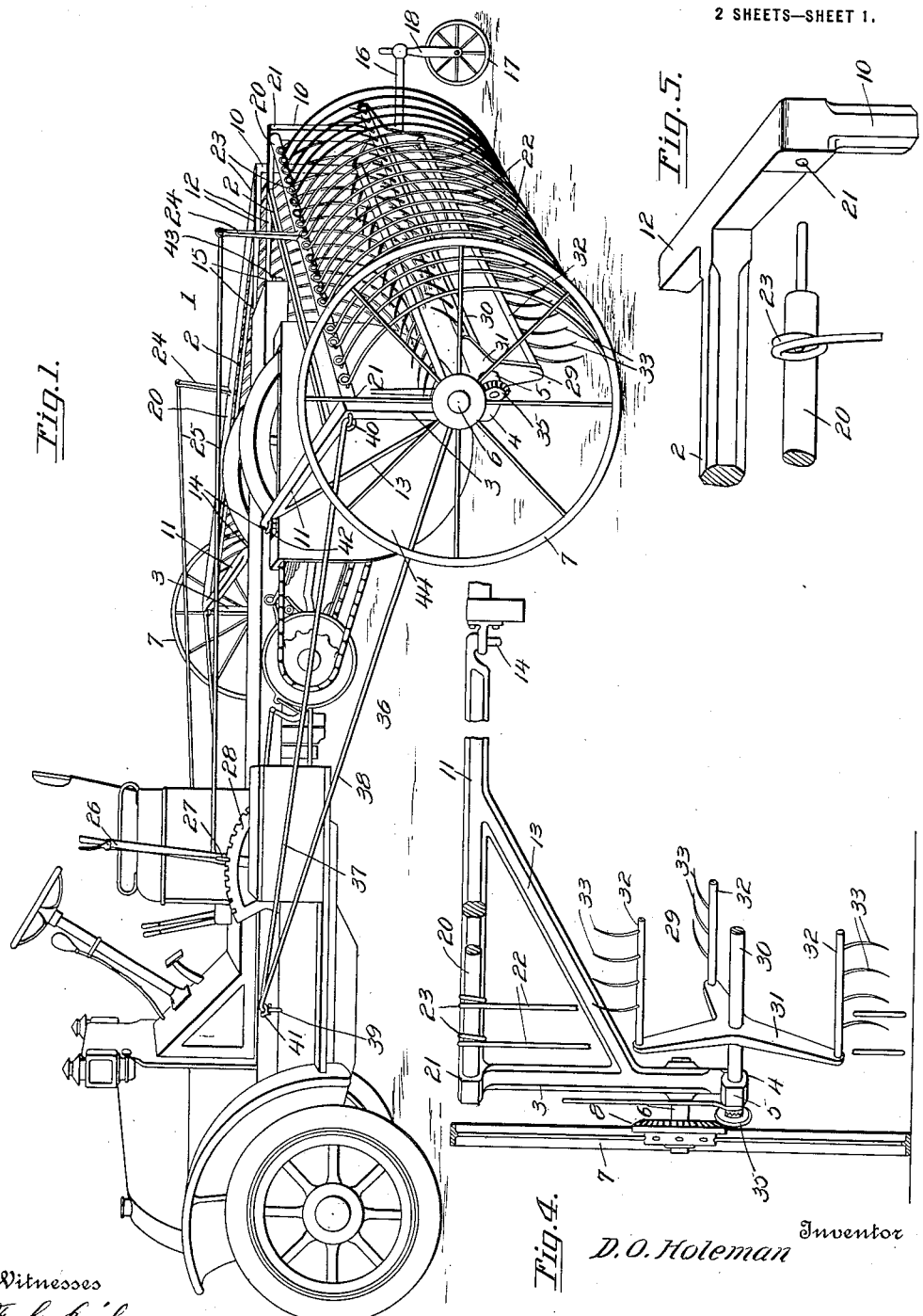

UNITED STATES PATENT OFFICE.

DAVID O. HOLEMAN, OF EL PASO, TEXAS.

AUTOMOBILE HAY-RAKE.

1,251,373.  Specification of Letters Patent.  Patented Dec. 25, 1917.

Application filed July 31, 1914. Serial No. 854,396.

*To all whom it may concern:*

Be it known that I, DAVID O. HOLEMAN, a citizen of the United States, residing at El Paso, in the county of El Paso and State of Texas, have invented new and useful Improvements in Automobile Hay-Rakes, of which the following is a specification.

This invention is an improved hay rake, for farm use, adapted to be attached to and operated by an automobile or motor truck or wagon and the invention consists in the construction, combination and arrangement of devices hereinafter described and claimed.

In the accompanying drawings:

Figure 1 is a perspective view of a hay rake constructed in accordance with my invention, showing the same adapted to be attached to and arranged for operation by an automobile.

Fig. 2 is a rear perspective view of the same.

Fig. 3 is a rear elevation of the rake.

Fig. 4 is a detail rear elevation, partly in section, of the same.

Fig. 5 is a detail perspective view of the outer portion of the frame of the rake, showing the rake head dismounted.

In practice I usually operate two of my improved rakes by an automobile or motor truck and the rakes are reversely arranged and so constructed that they are adapted to be used on opposite sides of the automobile or truck. The rakes being identical in construction excepting one is adapted for use on the right hand and the other for use on the left hand side of the automobile truck I will only describe one of the rakes, in detail.

The rake frame 1 has a cross bar 2 at the outer end of which is a vertical standard 3 which has its lower end curved rearwardly as at 4 and provided with a bearing 5. The said standard is also provided, at a point a suitable distance above the bearing 5 with an outwardly extending stub axle 6 on which a ground wheel 7 is mounted for rotation, the ground wheel being provided on the inner side of its hub with a beveled gear 8. A vertical standard 10 is at the inner end of the cross bar 2 and at the outer end of said cross bar is a forwardly extending obliquely arranged draft bar 11. A draft bar 12 is attached to the opposite end of the cross bar 2 and also to the upper end of the standard 10. An inclined brace rod 13 connects the lower end of the standard 3 and the inner end of the draft bar 11. A downwardly extending coupling hook 14 is at the front end of the draft bar 11. The draft bar 12 has a similar coupling hook 15 at its front end.

A bar 16 extends rearwardly from the lower end of the standard 10 and is provided at its rear end with a pivotally mounted fork in which a trailing wheel 17 is mounted. An inclined brace 19 has its front end connected to the front end of the draft bar 12 and its rear end to the lower end of the standard 10.

The rake comprises a shaft 20 which is mounted in bearings 21 at the rear ends of the draft bars 11—12, and a series of teeth 22 which have spring coils 23 that are arranged around and attached to the said shaft. A lever 24 is attached to and extends upwardly from the center of the shaft 20 and is connected by a rod 25 to a lever 26 of the automobile, the said lever being provided with a locking dog 27 which coacts with a segment rack 28 to secure said lever in any desired position.

A cleaning reel 29 is arranged in front of the rake teeth and comprises a shaft 30, heads 31 on said shaft, bars 32 connecting said heads and parallel with said shaft and cleaning teeth 33 which extend outwardly from said bars. The shaft 30 has one end mounted in the bearing 5 of the standard 3 and the other end mounted in a bearing 34 at the lower end of the standard 10. At the outer end of said shaft is a beveled gear 35 which engages the beveled gear 8. Hence when the rake is in motion and being drawn along by the automobile or truck, the cleaning reel, being geared to the ground wheel 7 is revolved and serves to keep the rake teeth clean and serves to deliver the hay at the rear end of the rake in a windrow, or rather to move the hay obliquely and from the inner end of the rake into the space in rear of the automobile or truck. The rake can be dumped at any time desired by operating the lever 26 as will be understood.

A draft frame 36 comprises a pair of forwardly converging rods 37—38 which have their front ends united and provided with a downturned coupling hook 39 and have their rear ends pivotally connected as at 40 to the upper and lower ends of the standard 3.

The automobile or truck is provided on each side with coupling eyes 41—42—43 for engagement respectively by the coupling hooks 30—14 and 15. Hence the rake is attached on one side of the frame of the automobile or truck, is arranged obliquely thereto and also somewhat in rear thereof as shown, so that when the automobile or truck is in motion the rake is drawn thereby and can be caused to operate as desired. To prevent the rakes from impeding the rear wheels of the automobile or truck I provide the automobile or truck with fenders 44 which are arranged at the outer sides of its rear wheels. As here shown, and ordinarily, when an automobile is to be employed for pulling and operating my improved rakes the body of the automobile is first removed from the chassis.

Having thus described my invention, I claim:—

In combination with a vehicle, a pair of side delivery rakes positioned in rear of and in offset relation to the vehicle, and each comprising a wheel frame including a cross bar, forwardly converging draft elements secured to the ends of said cross bar, and a rake having its head journaled to the frame; means for attaching said draft elements to the vehicle so that said draft elements positively hold the rakes in such rear and offset relation to the vehicle, and rake lifting means for the respective rakes, said means including a lever projecting from the head of each rake, a lever pivoted on the vehicle, and a rod connecting said levers.

In testimony whereof I affix my signature in presence of two witnesses.

DAVID O. HOLEMAN.

Witnesses:
 THORNTON HARDIE,
 JAY F. KNOX.